United States Patent [19]

Chintamani et al.

[11] Patent Number: 5,405,106

[45] Date of Patent: Apr. 11, 1995

[54] APPARATUS FOR PROVIDING INCREASED FLUID FLOW TURNING VANE EFFICIENCY

[75] Inventors: Seetharam H. Chintamani, Issaquah; Richard S. Sawyer, Kent, both of Wash.

[73] Assignee: The Boeing Company, Seattle, Wash.

[21] Appl. No.: 916,241

[22] Filed: Jul. 20, 1992

[51] Int. Cl.⁶ .............................................. B64C 7/00
[52] U.S. Cl. ............................... 244/23 D; 415/208.1; 138/39; 73/147
[58] Field of Search .................... 244/198, 12.5, 23 D; 73/147; 415/208.1; 138/37, 39; 416/DIG. 3

[56] References Cited

U.S. PATENT DOCUMENTS

| | | | |
|---|---|---|---|
| 1,613,348 | 1/1927 | Falkenthal | 244/198 |
| 2,258,731 | 10/1941 | Blumenthal | 415/208.1 |
| 3,307,587 | 3/1967 | Rylatt | 138/39 |
| 3,421,446 | 1/1969 | Strscheletzly | 415/208.1 |
| 4,469,446 | 9/1984 | Goodboy | 138/39 |
| 4,995,426 | 2/1991 | Hinden | 138/39 |

FOREIGN PATENT DOCUMENTS

| | | | |
|---|---|---|---|
| 426988 | 3/1926 | Germany | 416/DIG. 3 |
| 817707 | 8/1959 | United Kingdom | 416/DIG. 3 |

OTHER PUBLICATIONS

Tuttle & Bailey Santrols, .Catalog #41, p. 48.

*Primary Examiner*—Galen L. Barefoot
*Attorney, Agent, or Firm*—Robert H. Sproule

[57] ABSTRACT

A device for changing the direction of airflow inside a duct includes a curved panel portion with a leading edge and a trailing edge. The leading edge includes a spanwise extending rounded element which eliminates turbulent separation resulting from the change in airflow direction.

12 Claims, 5 Drawing Sheets

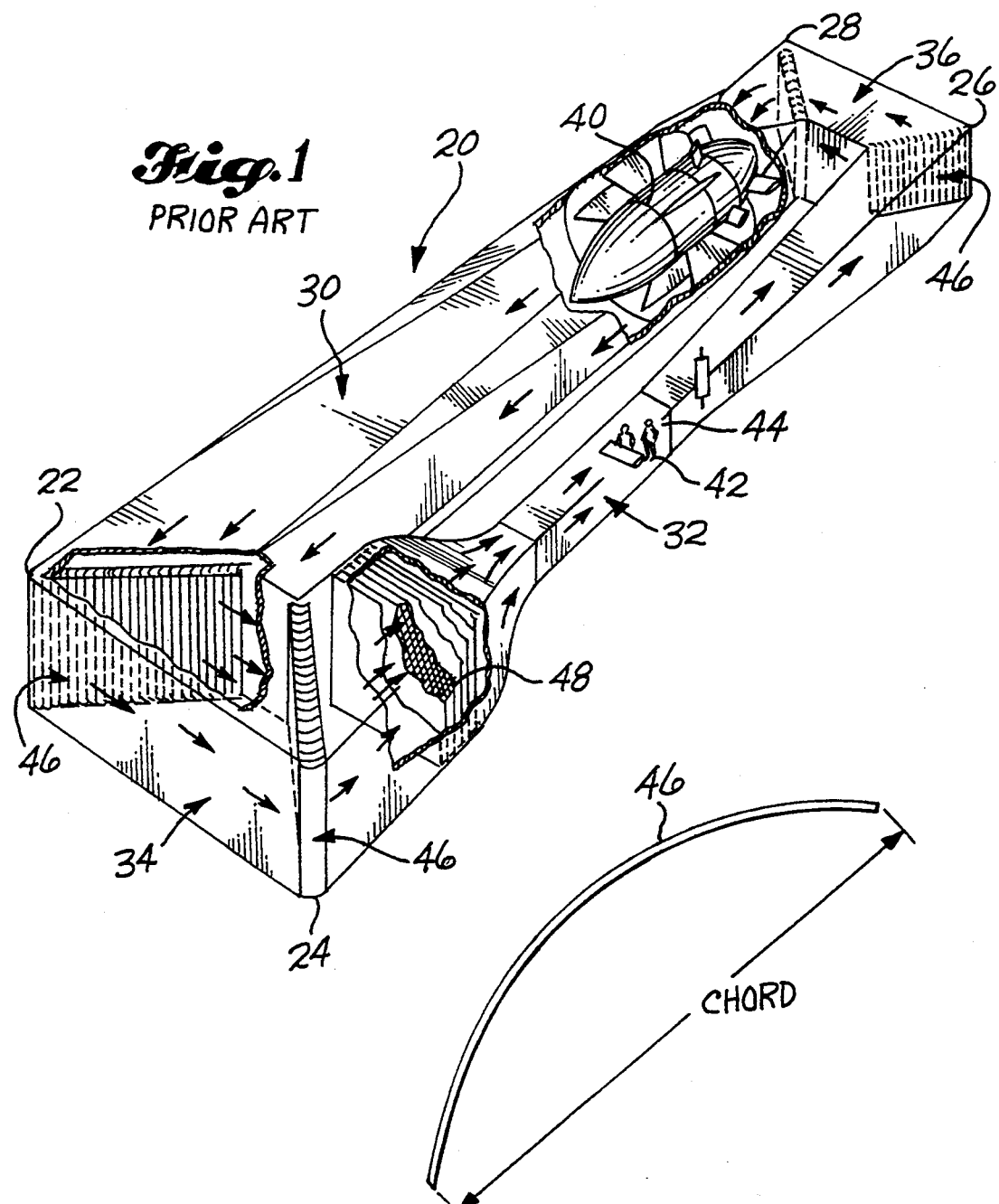

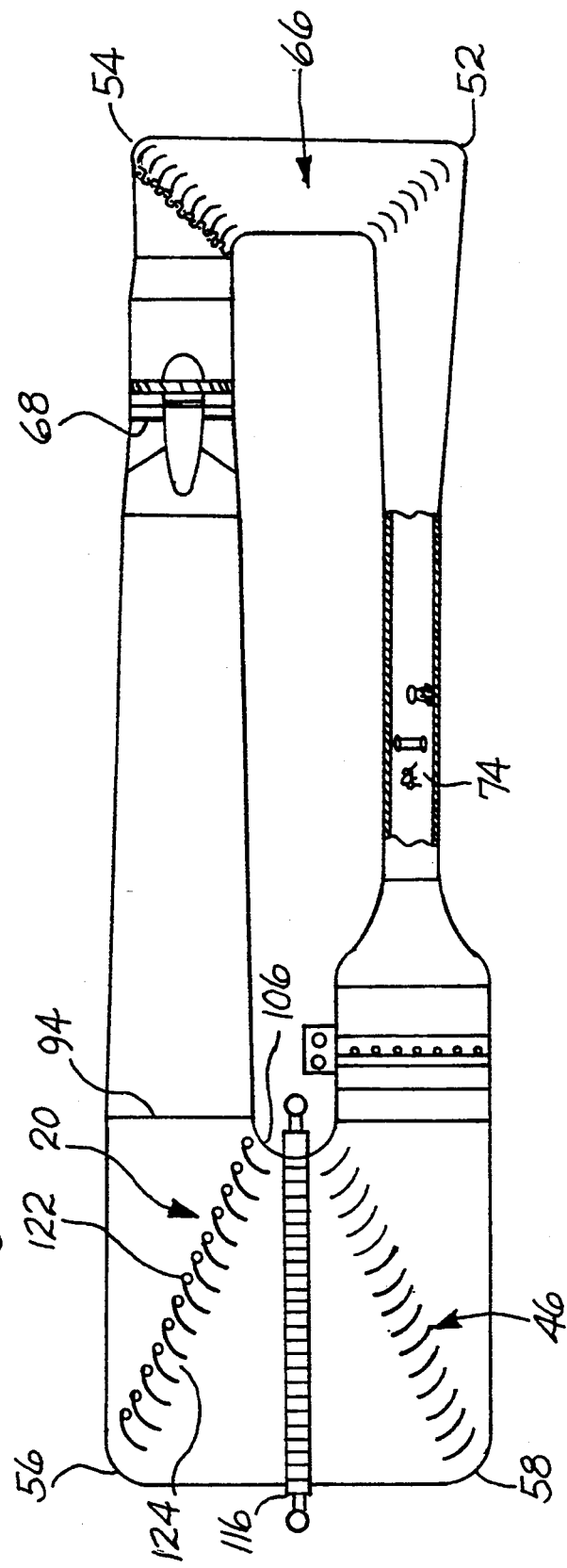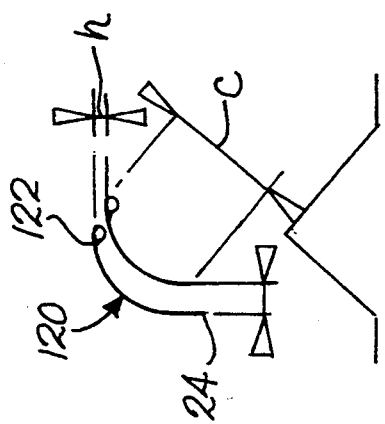

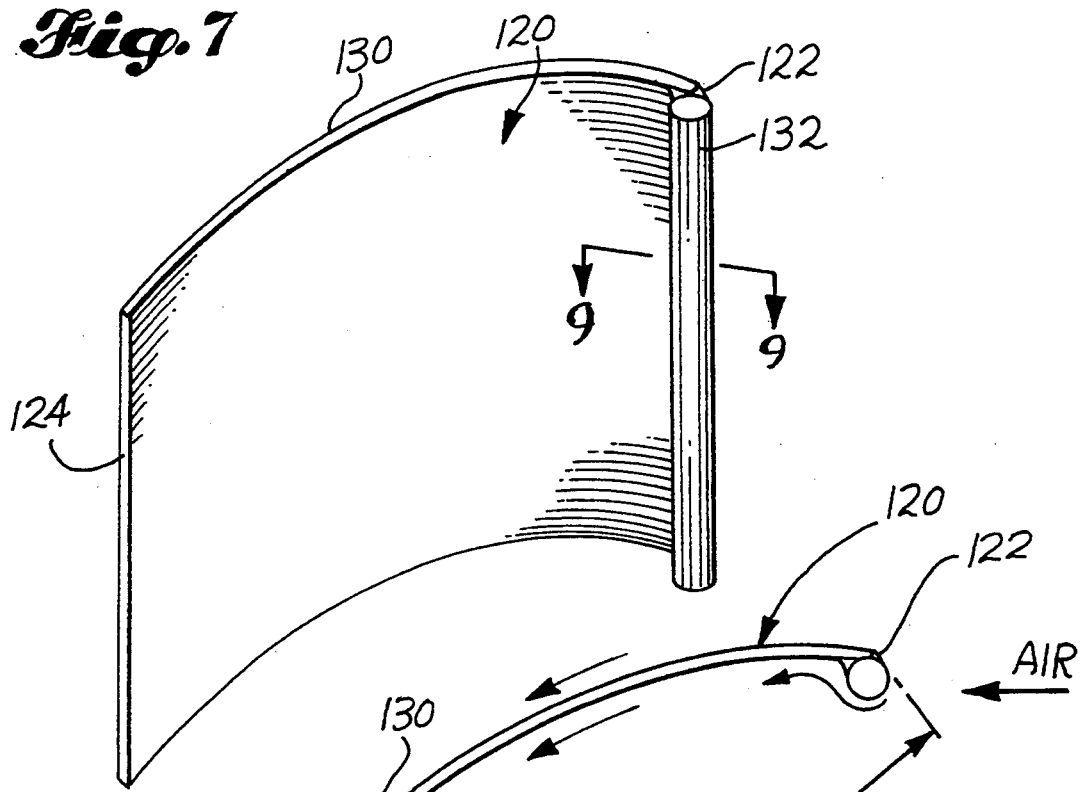
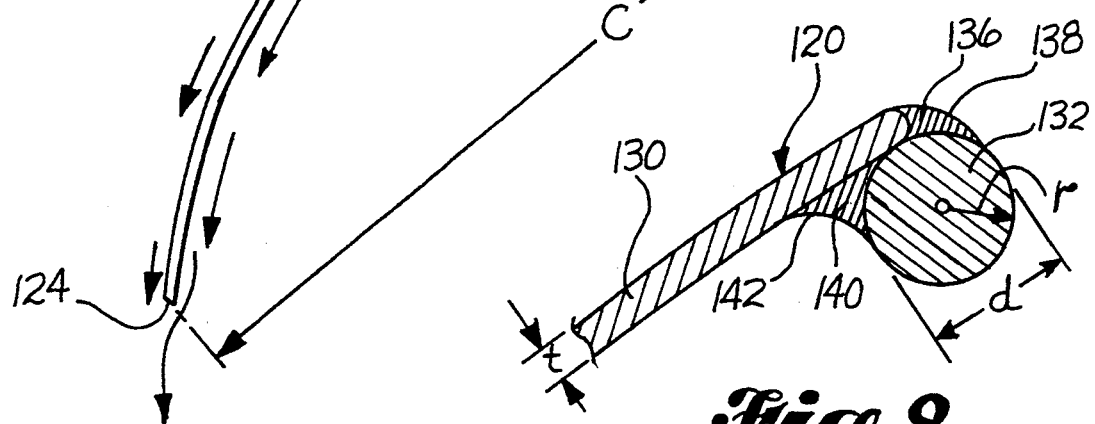

APPARATUS FOR PROVIDING INCREASED FLUID FLOW TURNING VANE EFFICIENCY

TECHNICAL FIELD

The present invention pertains to apparatus for redirecting a flow of fluid.

BACKGROUND OF THE INVENTION

There are many devices which redirect or turn the flow of a fluid to achieve such fluid flow redirection in an efficient manner. For example, devices such as jet engine inlet guide vanes, air conditioning ducting, and automobile spoilers operate to redirect the flow of air for various purposes. However, it is generally desirable to redirect the fluid flow in a manner that flow pressure losses and turbulence are minimized.

An application in which it is important to maximize air turning efficiency (and minimize turbulence) is in the area of wind tunnels. In a typical wind tunnel a model to be tested is placed in the wind tunnel and measurements are made of the airflow over the model-under-test. The wind tunnel typically is a closed rectangular tube inside of which air is driven by a large fan. At each of the four corners of the wind tunnel the air is turned through a ninety degree bend. In addition, it is important that the airflow delivered to the model-under-test be uniform.

In conventional wind tunnels, turning vanes are provided at the corners of the wind tunnel to help direct the air around the corners in a manner to maximize turning efficiency and to minimize turbulence. However, even in these conventional wind tunnels which use conventional turning vanes the turbulence and nonuniform flow of the air can be substantial.

A number of conventional airflow turning devices have been disclosed. For example, U.S. Pat. No. 2,735,612 by Hausmann discloses airfoil shaped vanes for improving air flow in passages. In addition, U.S. Pat. No. 1,996,596 by Smith Jr. discloses a fluid duct having a number of curved blades for reducing turbulence at bends and elbows of the duct. Furthermore, U.S. Pat. No. 2,662,553 by Dimmock discloses duct elbows for gaseous fluid flow systems wherein a number of curved blades are located at the elbow for improving flow through the elbows. And also, U.S. Pat. No. 2,813,708 by Frey discloses curved flow bodies for improving flow characteristics at bends in brick-lined furnaces.

SUMMARY OF THE INVENTION

The present invention pertains to a device for redirecting fluid flow. The device includes a panel element having a leading edge, a trailing edge and a curved element extending between the leading edge and the trailing edge such that the curved panel element has a maximum thickness dimension t. In addition, the device includes a leading edge element, which has a first end, a second end and a curved element therebetween such that a distance between the first end and the second end is equal to d wherein d is greater than t. Furthermore, the leading edge element is connected to the leading edge of the panel element in a spanwise direction such that when fluid travels in the first direction toward the leading edge element, the fluid travels around the leading edge element and along the panel portion where it is caused to flow in a second direction, which is different from the first direction.

BRIEF DESCRIPTION OF THE DRAWINGS

These and other features of the present invention will be described in more detail in the following Detailed Description in conjunction with the attached drawings, in which:

FIG. 1 is an isometric view of a conventional wind tunnel;

FIG. 2 is an end view of a conventional airflow turning vane;

FIG. 4 is a plan view of the wind tunnel of the present invention;

FIG. 6 is a top view of two turning vanes of the present invention;

FIG. 7 is an isometric view of the turning vane of the present invention;

FIG. 8 is an end view of the turning vane of the present invention; and

FIG. 9 is a partial end sectional view of the turning vane of the present invention.

DETAILED DESCRIPTION

Figure 3:
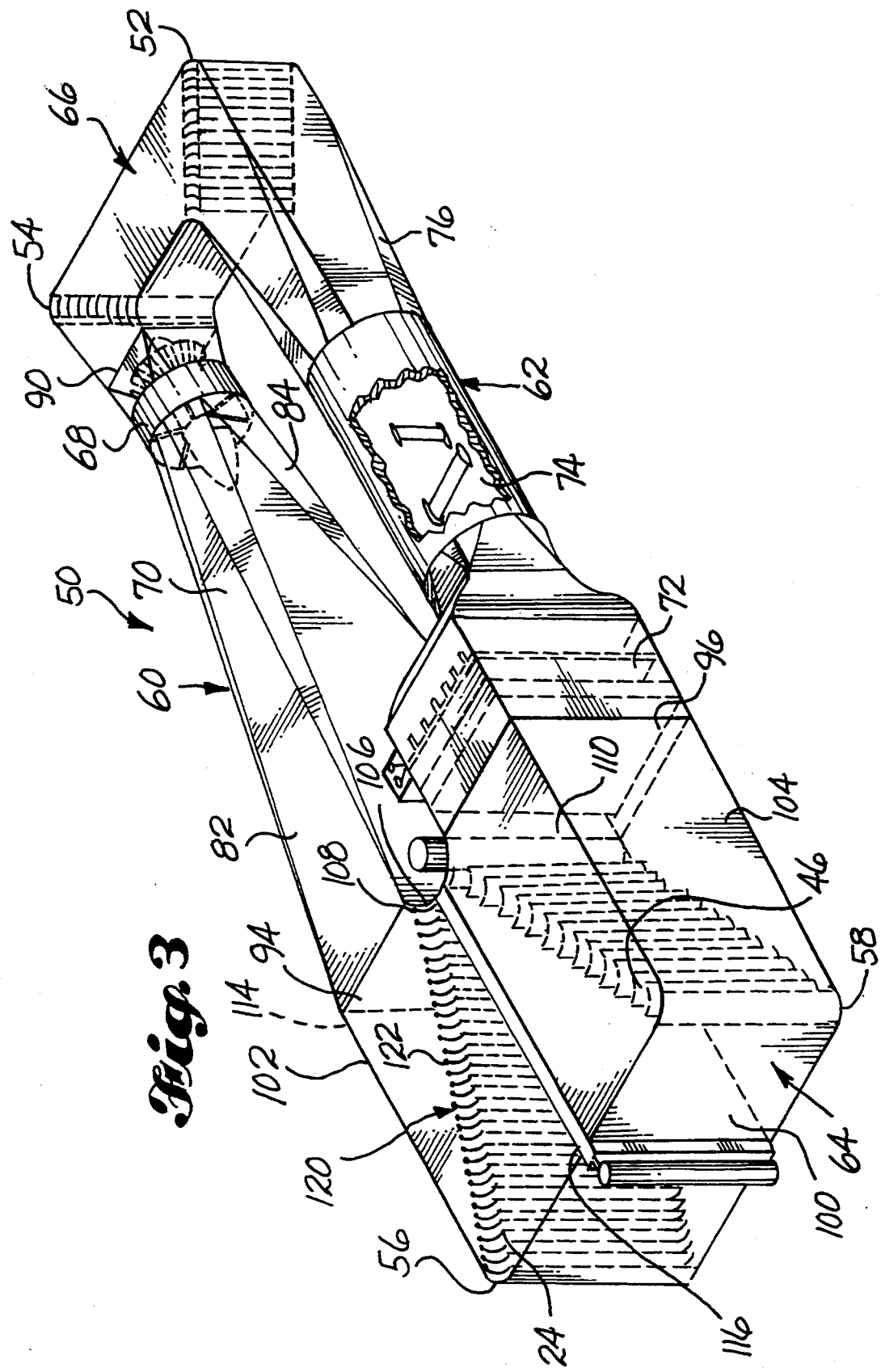
FIG. 3 is an isometric view of the wind tunnel of the present invention.

The present invention pertains to a device for redirecting the flow of a fluid, such as air, in an efficient and nonturbulent manner. The present device may be used in any application where redirecting the flow of fluid is a requirement. Examples of such applications with regard to redirecting the flow of air include air conditioning ducts, engine inlet guide vanes, spoilers, aircraft leading edge devices, and the like.

In an exemplary embodiment the present invention is a turning vane which is used in a wind tunnel. Before describing the present invention in greater detail, an brief explanation of a conventional wind tunnel will be provided. Referring first to FIG. 1, there is shown a conventional wind tunnel, generally indicated at 20, having a generally rectangular plan configuration including ninety degree corners 22, 24, 26, and 28. The wind tunnel is a closed tube made up of two longer straight tunnel duct sections indicated at 30, 32 and two shorter tunnel duct end sections indicated at 34, 36. Air is driven though the tunnel by a fan 40 located in tunnel section 30. A model-under-test 42 is placed in a test section 44 of tunnel section 32. As shown in FIG. 1, the cross-sectional configuration of tunnel section 32 is reduced prior to the test section 44 in order to increase the velocity of the air flow over the model-under-test.

Turning of the air through the corners 22, 24, 26, and 28 is aided by a number of curved conventional turning vanes 46 which are shown more clearly in FIG. 2. Each turning vane is made up of a curved panel having a uniform thickness dimension and a blunt leading edge and a blunt trailing edge. Other conventional turning vanes (not shown) may be used which are designed and manufactured to precise aerodynamic contours in order to maximize turning efficiency. Although the contoured turning vanes are more efficient in turning air, they are also much more costly to design and manufacture than the conventional turning vanes shown in FIGS. 1 and 2. In order to further reduce the turbulence and to improve the uniformity of air flow, a honeycomb 48 is positioned across tunnel section 32 prior to its convergence into test section 44.

Having described a conventional wind tunnel, attention now will be turned to an icing wind tunnel of the present invention, generally indicated at 50, and shown in FIG. 3. More specifically, the purpose of the present tunnel 50 is to provide an environment for the accretion of ice on a model-under-test. In this manner, ice buildup on the model-under-test can be accomplished to simulate ice buildup on the actual airplane. Heretofore, much of the ice buildup testing had to be done on the actual airplane. As part of the requirements outlined in FAR, part 25, an airframe manufacturer is required to demonstrate the handling qualities of an airplane flying under icing conditions. The handling qualities of the airplane degrade dramatically due to ice accretion on sensitive areas such as wing leading edges and nacelle inlets. Estimation of performance degradation is usually done in two stages: (1) by extraction of ice shapes under various flight conditions by flight testing, and (2) by demonstration of airworthiness/handling qualities with deformed leading edges/nacelle inlets extracted from the shapes obtained from flight testing.

Extraction of ice shapes through flight testing is extremely tedious and time consuming. It is not uncommon to wait for months to be able to fly the airplane in weather favorable to ice accretion. Consequently, the FAA has issued guidelines to demonstrate the ice shapes in the wind tunnel instead of actual flight testing.

The icing tunnel 50 of the present invention has a generally rectangular plan configuration including ninety degree corner portions 52, 54, 56 and 58. The tunnel is made up of a pair of parallel longer straight duct sections indicated at 60, 62, and a pair of parallel left, right shorter end duct sections indicated at 64, 66; the tunnel duct sections each having generally rectangular cross-sections of different dimensions. Located at the entrance to tunnel section 60 is a fan 68 for driving the air through the tunnel in a counterclockwise direction (when viewing FIG. 3). The fan is followed downstream by a fan diffuser section 70 which has a constantly expanding cross-section as this section proceeds in the downstream direction. In addition, there is included in tunnel section 62 a honeycomb 72 for improving airflow uniformity. The honeycomb 72 is followed by a test section 74 inside of which is placed the model-under-test. In turn, the test section 74 is followed by a diffuser section 76 which has a gradually expanding cross-section as this section proceeds in the downstream direction. It should be noted that the diffuser sections 70, 76 each must have a gradually expanding cross-section in order to minimize pressure losses through the tunnel circuit and to achieve uniform air flow through tunnel section 74.

More specifically, the tunnel section 60 includes a lengthwise extending exterior wall 82 and a parallel inner lengthwise extending wall 84, as well as a ceiling and a floor. Furthermore, the tunnel section 60 includes a right entrance end 90 where the air fan 68 is located, and a left discharge end which is connected to a entrance end 94 of the left tunnel end section 64. In turn, the tunnel end section 64 includes a discharge end 96 which connects with an entrance end of the tunnel section 62.

Still referring to FIG. 3, the tunnel left end section 64 is formed by an outer end wall 100 having connected in a perpendicular manner to its far end (when view FIG. 3) a side wall 102 and connected in a perpendicular manner to its near end a side wall 104. The tunnel end section 64 is further formed by a vertical U-shaped inner wall 106 which is located opposite the outer end wall 100 between the side walls 102, 104. The inner wall 106 includes a far vertical edge 108 and a near vertical edge 110. In addition, the tunnel end section 64 includes a ceiling and a floor.

Figure 5:
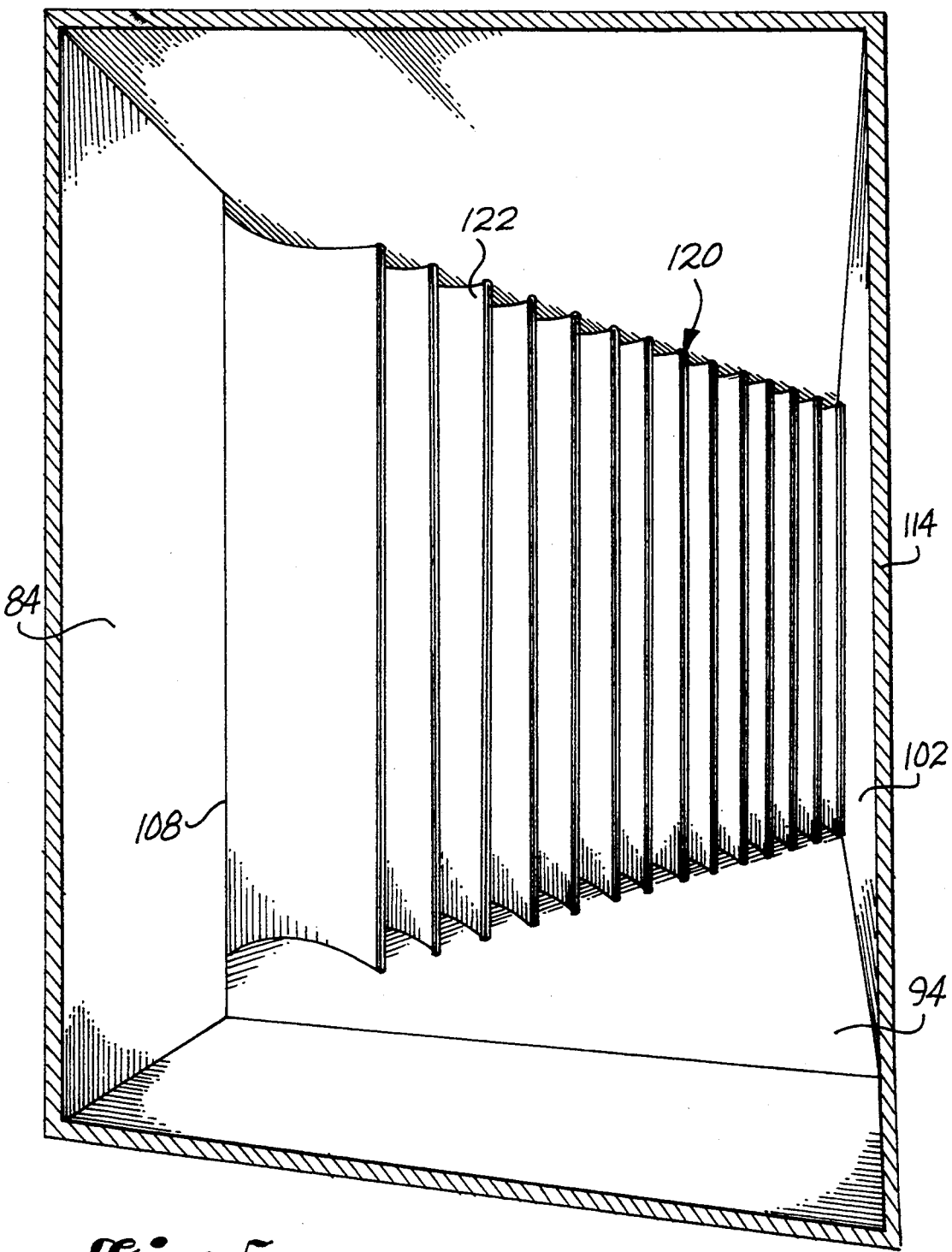
FIG. 5 is a cross-sectional end view of the wind tunnel of the present invention.

As further shown in FIG. 3, the left end tunnel section 64 has a larger cross-sectional area (measured between (i) walls 102 and 106, (ii) walls 100 and 106, and (iii) walls 104 and 106) than does the right end tunnel section 66. As shown best by FIG. 3, the cross-sectional area of diffuser section 70 increases at a constant rate downstream of the fan 68 until it terminates at the entrance 94 to the left tunnel end section. As shown in FIGS. 3 through 5, the tunnel end section entrance 94 is defined by (i) the far vertical edge 108 of inner wall 106 which joins with the left edge of inner wall 84, and (ii) a right side edge 114 of far sidewall 102 which joins with the left edge of the tunnel wall 82.

In order to generate icing conditions within the tunnel, there is a conventional heat exchanger 116 (FIG. 3) having a flat panel configuration extending across the left end tunnel section 64 between and perpendicular to the middle of exterior end wall 100 and the middle of interior wall 106. The heat exchanger 116 cools the air to promote the formation of ice on the model-under-test. In order to generate the proper icing conditions, it is necessary to have a uniform temperature of air coming out of the heat exchanger (with a margin no greater than plus or minus one degree Fahrenheit). Remaining within these limitations is further complicated by the large cross-sectional area of the heat exchanger 116. In order to generate icing conditions inside the tunnel, the maximum air velocity entering the entrance 94 should be about thirty five feet per second. The preferred maximum velocity to the heat exchanger 116 should be about fifteen feet per second with a with a maximum variation of plus or minus ten percent. This requires the cross-sectional area of the heat exchanger 116 be 2.34 times greater than the cross-sectional area of the entrance 94. Likewise, the cross-sectional area of the heat exchanger 116 should be 2.34 times greater than the cross-sectional area of exit 96 from the tunnel test section 64.

It should be appreciated in the present invention that expansion of the cross-sectional area of the wind tunnel occurs through the corner portion 56 between the entrance 94 and the heat exchanger 116. More specifically, the cross-sectional area of the tunnel end section increases at a constant rate when proceeding from the entrance 94 to the heat exchanger 116. This is sometimes referred to as an "expanding" corner which is different from many conventional wind tunnels where tunnel expansion occurs only in a linear direction along a straight tunnel section. An advantage of the expanding corner over linear expansion is that less real estate and tunnel hardware are needed. A disadvantage of the expanding corner is the increase in turbulent separation of air along the conventional curved panel turning vanes 46 (FIG. 2). In the past this would have required the use of the more costly contoured turning vanes in the expanding corner.

As further shown in FIG. 3, the present invention includes a number of upstanding curved turning vanes indicated at 120 which are located in the corner portion 56 of the icing tunnel end section 64. More specifically, each turning vane 120 includes a vertical leading edge 122 and a parallel vertical trailing edge 124 which extend between the ceiling and floor of the icing tunnel. In addition, the turning vanes 120 are spaced apart in a parallel manner, one behind the other, across the icing tunnel corner portion 56 as shown in FIG. 3. That is, the turning vanes 120 across the corner portion 56 are located between (i) inner wall 106 (starting between the right end of heat exchanger 116 and the vertical edge 108 of the inner wall 96) and (ii) corner 56 where the left edge of end wall 100 joins with the right edge of sidewall 102. On the other hand, since the corner portion 58 is a converging corner, it can use conventional curved panel turning vanes 46 located between inner wall 106 and corner 58 where the right edge of end wall 100 joins with the left edge of sidewall 104.

In the present exemplary embodiment, there are thirty turning vanes 120 spaced apart from each other in a somewhat parallel manner as shown in FIGS. 4 to 6. Vanes 120 have separation distances between their leading edges equal to 8.4 inches and separation distances between their trailing edges equal to 19.5 inches. More precisely, the distances between the vanes increase in a constant manner when proceeding from the leading edge to the trailing edge. Each turning vane 120 is further defined by a chord dimension "c" (FIG. 4) which represents a straight line distance between the vane's leading edge and its trailing edge. Furthermore, the distance between each turning vane is defined by a distance "h" in FIG. 6. In the present embodiment, the separation distance between the leading edges of the vanes is defined by a ratio h/c equal to 0.15 and the separation distance between the trailing edges of the vanes is defined by a ratio h/c equal to 0.245.

As shown in FIGS. 7 through 9 each turning vane 120 has a curved panel portion 130 (with a radius of 38.5 inches) extending between the leading edge 122 and the trailing edge 124 so that air flowing in a right-to left direction toward end section 64 (when viewing FIG. 3) is redirected in a ninety degree direction and so that the air flow is generally normal to the face of heat exchanger 116. In an exemplary embodiment, the panel portion 130 has a constant thickness.

As shown more clearly in FIGS. 7 through 9, each turning vane 120 includes a leading edge element 132 having a curved surface. In an exemplary embodiment the leading edge element 132 is a cylindrical element 132 which is attached to the concave side of the turning vane adjacent to the leading edge 122. The cylindrical element 132 extends along the length of the leading edge 122 and has a diameter of about two inches. It should be appreciated that the diameter "d" (FIG. 9) of cylindrical element 132 is larger than the thickness "t" of the panel portion 130 of the turning vane. In the present embodiment this ratio of the diameter of cylindrical element 132 to the thickness of the panel portion 130 of the turning vane is about 3.75 to 1. More generally, in the present invention the ratio of r/c is greater than 1.8 percent, where r is a radius dimension of the vane's leading edge element 132 (FIG. 9).

To reduce air turbulence around the leading edge of the turning vane, there is a forward fillet 136 having a convex exterior surface 138 which extends from the upper surface of the leading edge and terminates at a forward portion of the surface of the cylindrical element 132. Also, there is a rear fillet 140 having a concave surface 142 which extends from the lower surface of the turning vane and terminates at a rear surface of the cylindrical element 132.

In an exemplary embodiment of the present invention, the cross-sectional dimensions of the tunnel end section 64 where the turning vanes 120 are located are twenty feet (height) by 34.3 feet (width), and each turning vane 120 has a height of twenty feet and a chord length of fifty five inches with a thickness of about one tenth of an inch.

It should be further appreciated that the leading edge element 132 need not be cylindrical. That is, it need not be continuously rounded through 360 degrees. However leading edge element 132 should have a curved portion having a chord dimension which is greater than the thickness dimension of the panel portion 130.

It has been found that when using the turning vanes 120, as opposed to conventional curved plate turning vanes 46, there was a significant reduction in turbulence intensity and a significant improvement in airflow uniformity. More specifically, it was not necessary to use the conventional aerodynamically contoured turning vanes. Although not wishing to be bound by theory, it is believed that with conventional turning vanes 46 as the air flows around the blunt leading edge there results a large adverse pressure gradient which causes the boundary layer to separate from the vane resulting in turbulent separated flow. By increasing the radius of the turning vane's leading edge, the adverse pressure gradient is much smaller thereby allowing the boundary layer to remain attached to the turning vane and thereby eliminating turbulent flow separation.

What is claimed is:

1. Apparatus comprising:
   a. a duct having a first duct portion for receiving fluid therein in a first direction and a second duct portion for discharging the fluid therefrom in a second direction which is different from the first direction; and
   b. means for directing the fluid from the first duct portion to the second duct portion, the directing means located inside the duct and including (i) a panel element having a leading edge, a trailing edge and a curved element having a concave inner surface and extending between the leading edge and the trailing edge such that the panel element has a maximum thickness dimension t, and (ii) a curved leading edge element which is attached to the concave inner surface, which has a diameter d and a spanwise axis such that diameter d is greater than thickness t, the curved leading edge element being connected to the leading edge of the panel element in a spanwise direction along the leading edge such that the fluid travels in the first direction toward and generally perpendicular to the leading edge element and whereafter the fluid travels around the curved element and along the panel element where it is caused to flow in the second direction, the directing means being further characterized by the absence of a curved trailing edge element at the trailing edge of the panel element.

2. The apparatus as set forth in claim 1 wherein the directing means is further characterized by the absence of a curved trailing edge element having a diameter which is greater than the panel thickness t.

3. The apparatus as set forth in claim 1 wherein a ratio of the diameter d to the thickness t is about 3.75.

4. The apparatus as set forth in claim 1 wherein the leading edge element has a cylindrical configuration.

5. The apparatus as set forth in claim 1 wherein:
   a. the panel element has a chord dimension c;
   b. the leading edge element has a radius r; and c. the ratio r/c is always greater than or equal to two percent.

6. The apparatus as set forth in claim 1 wherein the fluid is air.

7. A test tunnel comprising:
a. a duct having a first duct portion for receiving fluid therein in a first direction, a second duct portion for discharging the fluid therefrom in a second direction which is different from the first direction, and a third duct portion for containing a device under test;
b. means for propelling the fluid through the duct; and
c. means for directing the fluid from the first duct portion to the second duct portion, the directing means located inside the duct and including (i) a panel element having a leading edge, a trailing edge and a curved element having a concave inner surface and extending between the leading edge and the trailing edge such that the panel element has a maximum thickness dimension t, and (ii) a curved leading edge element which is attached to the concave inner surface, which has a diameter d and a spanwise axis such that diameter d is greater than thickness dimension t, the curved leading edge element being connected to the leading edge of the panel element in a spanwise direction along the leading edge such that the fluid travels in the first direction toward the leading edge element where the fluid travels around the curved element and along the panel element where it is caused to flow in the second direction, the directing means being further characterized by the absence of a curved trailing edge element at the trailing edge of the panel element.

8. Apparatus comprising:
a. a panel element having a leading edge, a trailing edge and a curved element having a concave inner surface and extending between the leading edge and the trailing edge such that the panel element has a maximum thickness dimension t; and
b. a curved leading edge element which is attached to the concave inner surface and which has a diameter d and a spanwise axis, the curved leading edge element being connected to the leading edge of the panel element in a spanwise direction along the leading edge such that a fluid travels in the first direction toward the leading edge element where the fluid travels around the curved element and along the panel element where the fluid is caused to flow in the second direction, the apparatus being further characterized by the absence of a curved trailing edge element at the trailing edge of the panel element.

9. The apparatus as set forth in claim 8 wherein the directing means is further characterized by the absence of a curved trailing edge element having a diameter which is greater than the panel thickness t.

10. A method of directing fluid flow in a duct, the method comprising the steps of:
a. receiving the fluid in a first direction through a first portion of the duct;
b. discharging the fluid from a second portion of the duct in a second direction;
c. directing the fluid from the first duct portion to the second duct portion by means of a panel element having a leading edge, a trailing edge, a curved element having a concave inner surface extending between the leading edge and the trailing edge, and having a maximum thickness t;
d. causing the fluid to travel in the first direction toward and generally perpendicular to a curved leading edge element having a diameter d such that d is greater than t and having a spanwise axis and being connected to the concave inner surface adjacent to the leading edge of the panel element; and
e. causing the fluid to travel around the curved leading edge element and along the panel element where it is caused to flow in the second direction such that by travelling around the curved leading edge element a uniform flow of the fluid results.

11. The method as set forth in claim 10 wherein the flow of fluid along the panel element in the second direction is characterized by the absence of a curved trailing edge element at the trailing edge of the panel element having a diameter which is greater than the panel thickness t.

12. In a method of directing the flow of fluid in a duct wherein a fluid is received in a first direction through a first portion of the duct and discharged fluid from a second portion of the duct in a second direction and the fluid is directed from the first duct portion to the second duct portion by means of a panel element having a maximum thickness t and having a leading edge, a trailing edge, a curved element having a concave inner surface extending between the leading edge and the trailing edge, the improvement comprising the steps of:
a. causing the fluid to travel in the first direction toward and generally perpendicular to a curved leading edge element having a diameter d such that d is greater than t, and having a spanwise axis and being connected to the concave inner surface adjacent to the leading edge of the panel element; and
b. causing the fluid to travel around the curved leading edge element and along the panel element where it is caused to flow in the second direction such that by travelling around the curved leading edge element a uniform flow of fluid results.

* * * * *